United States Patent Office 3,427,209
Patented Feb. 11, 1969

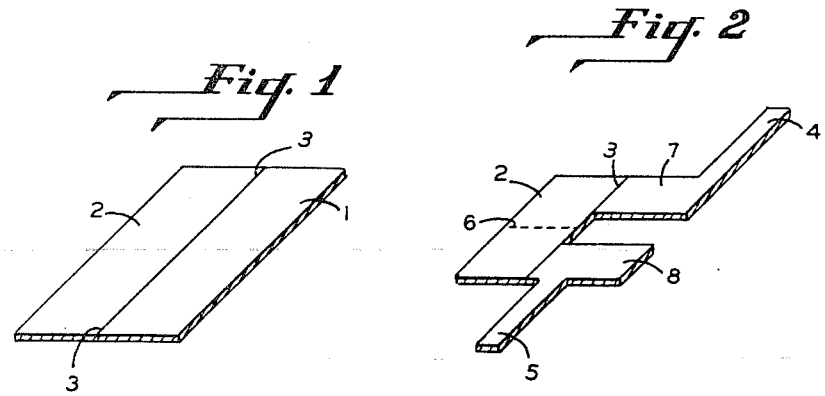
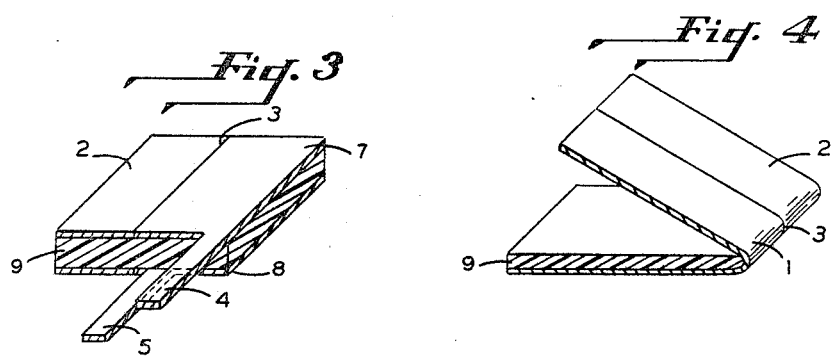
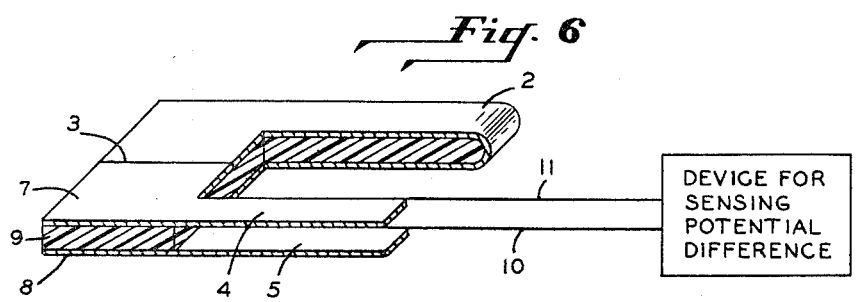
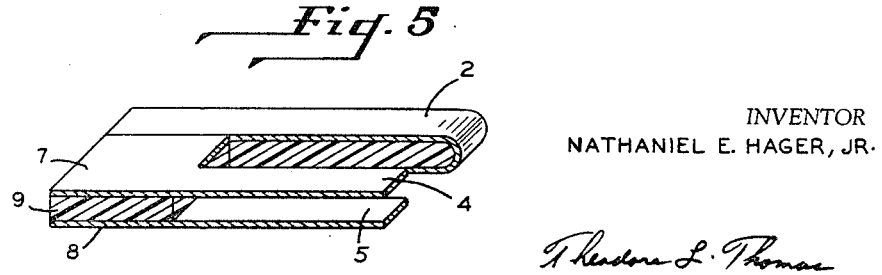

3,427,209
QUICK RESPONSE HEAT-SENSING ELEMENT
Nathaniel E. Hager, Jr., Lancaster County, Pa., assignor to Armstrong Cork Company, Lancaster, Pa., a corporation of Pennsylvania
Filed May 18, 1965, Ser. No. 456,700
U.S. Cl. 136—225                    7 Claims
Int. Cl. H01v 1/10

ABSTRACT OF THE DISCLOSURE

A heat-sensing element made from thin foils. A strip of a thin thermocouple material is doubled back on itself with electrical insulation positioned between the resulting opposing faces. A first platelet of a thermocouple material different from that of the strip is edge-abutted one of the faces of the strip. An electrical contact is positioned on this first platelet. A second platelet is edge-abutted the oher face of the strip and opposed to the first plaelet and is electrically insulated from the first platelet. An electrical contact is also positioned on this second platelet. No electrical connections exist between the first platelet and the second platelet except through the thermocouple junctions. Heat can transfer from the first platelet to the second platelet only by passing through the insulaion which separates the two platelets.

---

This invention relates generally to heat flow, and more particularly to a devise for measuring heat flow. Still more particularly, the invention relates to a high-speed, heat-sensing element which, when coupled with a device for sensing potential difference, will rapidly detect heat fluxes of various magnitudes.

There has long been a need for a sensitive device that can measure a variety of heat fluxes rapidly, preferably on the order of one second or less. Such a device should have the further advantages of not modifying the heat flow field and not requiring costly calibration. The device itself should be inexpensive and readily fabricated.

It is the primary object of the present invention to supply such a device. It is another object of the present invention to supply a heat-sensing element which can be readily fabricated and which when connected to a device for sensing potential difference will function with unusual rapidity.

These objects are accomplished in a straightforward and surprisingly simple manner. The invention contemplates a high-speed, heat-sensing element comprising a strip of thin thermocouple material doubled on itself and having electrical insulation positioned between opposing faces thereof. A first platelet is edge-abutted one of the faces of the above-described strip forming between the platelet and the strip a first junction capable of producing thermoelectric current. The first platelet has an electrical lead thereon suitable for connecting the platelet to a suitable device for sensing potential difference. A second platelet electrically insulated from the first platelet and edge-abutted to the other face of the above-described strip forms a second junction capable of producing thermoelectric current. The second platelet also has thereon an electrical lead adapted to connect that platelet to a device capable of sensing potential difference.

The heat-sensing element of the present invention will be made from thin films or foils of metals. The element has negligible thermal resistance compared to that of an air film at a solid-gas interface, and it is sufficiently small and has sufficiently low heat capacity that it will not modify the thermal field under study. It has low electrical resistance, so a microvoltmeter to which it is connected will operate with lowest possible noise level in the input circuit. The thickness of the sensing element will be measured in hundreds of an inch or less, and its area will generally be less than one square inch. The element will measure temperature differences on the order of 0.005° F. with an accuracy of about 10%, or a difference on the order of 0.01° F. with an accuracy of about 5%.

The heat-sensing element of the present invention will be better understood by reference to the attached drawings in which:

FIG. 1 illustrates an edge-welded piece of a strip of two thermocouple materials, FIG. 2 illustrates a preferred configuration to be cut from an edge-welded strip such as that shown in FIG. 1, FIG. 3 illustrates a heat-sensing element of the present invention made from the preferred configuration of FIG. 2, FIG. 4 illustrates the welded strip of FIG. 1 being folded on itself with electrical insulation therebetween, FIG. 5 illustrates an element of the present invention cut from FIG. 4, and FIG. 6 illustrates a different form of the element and its hookup to a device for measuring potential difference.

FIG. 1 shows edge-welded strips of thermocouple materials which may be copper 1 and constantan 2, edge-welded to form a junction 3 capable of producing thermoelectric current. Any of the metals suitable for forming thermocouple junctions may be used. Examples of such metal pairs are platinum-rhodium, platinum-rhodium alloys, Chromel-Alumel, Chromel-constantan, and iron-constantan. It is preferred to use copper-constantan both from the point of view of cost and for a lack of side effects. Most electrical lead wires are made of copper and thus may conveniently be connected without introducing additional thermoelectric currents into the circuitry by simply connecting copper wires to the copper electrical leads which are part of the sensing element of the present invention. It is preferred to prepare the thermocouple strip by edge welding together two foils which will form the thermocouple junction at the weld. In order that the heat capacity of the final heat-sensing element will be kept low, the metal foils or metal films should be kept thin, preferably in the range of about 0.01–0.0001 inch. Where edge welding becomes impractical due to the thinness of the foils, abutting metallic films may be laid down by chemical means.

Referring to FIG. 2, the portion of the thermocouple strip shown in FIG. 1 is cut with a razor blade or other convenient cutting tool to the configuration shown in FIG. 2. This configuration leaves the electrical leads 4 and 5, preferably in the copper side of the strip, eliminating in the copper any direct electrical connection between the leads 4 and 5. The FIG. 2 configuration may then be folded, doubled, or otherwise bent on itself along the dotted line 6, so that copper platelets 7 and 8 assume opposing positions. The folded configuration of FIG. 2 will produce the apparatus of FIG. 3 once the electrical insulation 9 has been introduced. Two thermocouple junctions are thus formed. In FIG. 3, the electrical leads 4 and 5 are in a staggered position relative to one another; they might also be in corresponding positions.

The electrical insulation 9 may be any material which will electrically insulate the opposing faces of the platelets 7 and 8 and the opposing faces of the continuous strip 2. The electrical insulation 9 thus separates all the parts of the heat-sensing element save the continuous strip 2 which is electrically a single piece. The platelets 7 and 8 are not in electrical contact at all save across the thermocouple junctions 3 and through the potential sensing device.

The electrical insulation 9 may be a varnish, a synthetic resin, a natural resin, a rubber, or a thin film of paper or saturated paper or cloth. It is preferred, however, for the sake of quick response and low heat capacity that the electrical insulation layer 9 be maintained as thin as possible. A varnish may simply be painted on the surfaces of the sensing element that are to be opposed. Alternatively, a thin film of a solution or an emulsion of, for example, poly(vinyl acetate), may be painted on the surfaces that are to be opposed followed by drying, folding and heating under elevated pressure to bring about adhesion of opposing surfaces of the metals to the electrical insulation. Ideally, the electrical insulation should bond to the thermocouple foil without introducing significant thickness of adhesive of its own volume, while being relatively incompressible so that its thickness remains unchanged during use. The functioning of the heat-sensing element is due to a temperature differential between the two faces of the sensing element. Under steady-state conditions in a thermal field, the element produces EMF proportional to the temperature difference between the two faces. The heat flux is then obtained from the EMF using a calibration factor computed on an absolute basis from known properties of both the sensing element as a whole and the foil from which it is made.

In FIG. 4 the thermocouple's edge-welded strip of FIG. 1 is folded on itself after a film of electrical insulation 9 has been deposited on approximately one-half the length of the thermocouple strip. The electrical insulation 9 may be, as stated above, a thin film of poly(vinyl acetate). Such electrical insulation may also be prepared by cutting with a microtome an extremely thin slice of cork or cork composition and adhering the thin slice to the metal foils in the strip with a diluted neoprene adhesive. Successful sensing elements have thus been made in which the adhesive film was so thin it could not be detected by thickness measurements.

FIG. 5 shows the electrical connectors 4 and 5, the continuous strip 2, the platelets 7 and 8, and the electrical insulation 9. FIG. 6 shows a sensing element similar to FIG. 5 except that an additional segment has been cut from the continuous strip 2 as shown. Electrical leads 10 and 11 in FIG. 6 connect the sensing element to a device for sensing potential difference. These devices will normally constitute microvoltmeters, the more sensitive the better as long as undue noise is not introduced with increased sensitivity. A Keithley microvoltmeter is suitable. Such microvoltmeters may be connected to recorders in order to make a tracing or other indication of the response of the sensing element. A Sanborn recorder in conjunction with a Keithley microvoltmeter yields excellent results. A nanovoltmeter now available from Keithley Instruments, Inc., has a sufficiently low noise level that it can be used with the preferred heat-sensing element of the present invention to detect temperature differences of the order of one 15-millionth of a degree and measure heat fluxes as small as 0.0001 watt per square foot with response times of less than one second. With some recorders, a separate, high-gain amplifier will be necessary.

Using sensing elements made as described above, it will be found that a stable reading—steady-state conditions—may be obtained in less than 0.5 second. Additionally, the sensing elements are so minute, having a thickness, when desirable, on the order of 0.005 inch, that they do not disturb the thermal field under study. Even roughly-made elements can give readings with better than 5% accuracy. Heat fluxes as low as 0.01 watt per square foot have already been detected with a one-second response. At the same time the sensing elements can easily be fabricated by hand in a short period of time. The output of the elements can be read on standard electronic microvoltmeters available in most laboratories and from most electronic equipment suppliers. Sensing elements may readily be made from foils of edge-welded copper-constantan thermocouple material having a thickness of 0.00025 inch, producing a heat-sensing element having a thickness on the order of 0.001 inch. Such a sensing element can monitor unsteady heat flow as a function of time or it can produce quick readings in a steady heat flow. The element has been shown to sense plus or minus 1° F. variations in the temperature of sheet goods traveling at a rate of 50 feet per minute when the sensing element was positioned in a fixed position 0.5 inch from the surface of the moving sheet. The element is useful as a transducer for remote temperature measurements of all kinds. It can be used to monitor performance of components of cold rooms, refrigerated trucks, refrigerators, insulation systems, ovens, heaters, hot air systems, and air conditioning systems.

Examples

A series of heat-sensing elements was made having the configuration of FIG. 3. A copper-constantan foil strip was used in each case. The area of the element in each case was about 0.5 inch by 0.5 inch. Different insulation materials were used as shown in the table below, the materials having the thicknesses also stated in the table. Each element was placed on a base block of the stated material and held in place with a pressure-sensitive tape. The heat flux was supplied by a 100-watt lamp. A Sanborn chart recorder was used to record the element output as the flux from the lamp was directed to the sensing element and then subsequently interrupted.

| Foil Thickness (inch) | Insulation Material | Insulation Thickness (inch) | Base Block | Response Time (seconds) | Sensitivity (microvolt-hr.-ft.²/B.t.u.) |
|---|---|---|---|---|---|
| 0.002 | Tape | 0.005 | Steel | 5 | 0.14 |
| 0.002 | do | 0.010 | do | 6 | 0.28 |
| 0.002 | do | 0.005 | Cork | 2 | 0.14 |
| 0.00025 | Mylar | 0.001 | Steel | 0.4 | 0.019 |
| 0.002 | Poly(vinyl acetate) | 0.00475 | Foam Rubber | 1.0 | 0.089 |

The tape in the second column above is a pressure-sensitive tape coated on both faces and having a total thickness of 0.005 inch. A double thickness was used. The "Mylar" film used is a film of polyethylene terephthalate.

I claim:
1. A heat-sensing element comprising a strip of thin thermocouple material doubled on itself such that the free ends thereof are substantially coextensive and having electrical insulation positioned between opposing faces thereof, a first platelet edge-abutting one of the faces of said strip and forming therebetween a first junction capable of producing thermoelectric current and having an electrical lead thereon, and a second platelet opposing said first platelet, having an electrical lead thereon, and edge-abutting the other of said faces of said strip and forming therebetween a second junction capable of producing thermoelectric current, said second platelet being electrically insulated from said first platelet save across said thermocouple junctions.

2. A heat-sensing element according to claim 1 wherein said junctions comprise copper-constantan junctions.

3. A heat-sensing element according to claim 1 wherein said strip of thin thermocouple material and said platelets are metallic foils.

4. A heat-sensing element according to claim 1 having a total thickness less than 0.005 inch.

5. A heat-sensing element according to claim 1 wherein said electrical insulation comprises a synthetic resin.

6. A heat-sensing element according to claim 1 wherein said electrical insulation comprises a cellulose tape.

7. A heat-sensing element comprising a strip of constantan foil doubled on itself such that the free ends thereof are substantially coextensive and having electrical insulation of thickness less than about 0.01 inch positioned between opposing faces thereof, a first platelet of copper foil edge-welded to one of the faces of said constantan strip and forming therebetween a first thermocouple junction and having an electrical lead thereon, and a second platelet of copper foil opposing said first platelet and electrically insulated save across thermocouple junctions from said first platelet with insulation having said thickness and edge-welded to the other of said faces of said constantan strip to form a second thermocouple junction and having an electrical lead thereon.

References Cited

UNITED STATES PATENTS 3,018,311   1/1962   Bagno et al. _____ 136—225

OTHER REFERENCES

R. G. Huebscher et al.: A Low Inertia, Low Resistance Heat Flow Meter, TH7201 H54 Heating, Piping and Air conditioning, May 1952 (pages. 111–116 relied on).

E. N. Brown et al.: Steady State Heat Flux Gauge Rev. Sci. Instr., 32 984, (1961).

H. R. Simonds et al.; Handbook of Plastics 2nd ed., Van Nostrand Co. (1949) pages 579–586 relied on).

WINSTON A. DOUGLAS, *Primary Examiner.*

M. J. ANDREWS, *Assistant Examiner.*

U.S. Cl. X.R.

136—201